(12) United States Patent
Cuevas Ramirez

(10) Patent No.: US 11,140,620 B2
(45) Date of Patent: Oct. 5, 2021

(54) ACCESS NETWORK SELECTION

(71) Applicant: British Telecommunications Public Limited Company, London (GB)

(72) Inventor: Maria Cuevas Ramirez, London (GB)

(73) Assignee: British Telecommunications Public Limited Company, London (GB)

( * ) Notice: Subject to any disclaimer, the term of this patent is extended or adjusted under 35 U.S.C. 154(b) by 0 days.

(21) Appl. No.: 16/498,103

(22) PCT Filed: Mar. 29, 2018

(86) PCT No.: PCT/EP2018/058199
§ 371 (c)(1),
(2) Date: Sep. 26, 2019

(87) PCT Pub. No.: WO2018/178293
PCT Pub. Date: Oct. 4, 2018

(65) Prior Publication Data
US 2020/0107255 A1    Apr. 2, 2020

(30) Foreign Application Priority Data

Mar. 31, 2017   (EP) ..................... 17164395

(51) Int. Cl.
*H04W 48/18*   (2009.01)
*H04W 36/00*   (2009.01)
(Continued)

(52) U.S. Cl.
CPC ....... *H04W 48/18* (2013.01); *H04W 36/0083* (2013.01); *H04W 36/14* (2013.01); *H04W 36/30* (2013.01); *H04W 88/06* (2013.01)

(58) Field of Classification Search
None
See application file for complete search history.

(56) References Cited

U.S. PATENT DOCUMENTS

| 8,805,374 B2 | 8/2014 | Zhu et al. |
| 9,319,959 B2 | 4/2016 | White et al. |

(Continued)

FOREIGN PATENT DOCUMENTS

| CN | 103297632 A | 9/2013 |
| CN | 103583065 A | 2/2014 |

(Continued)

OTHER PUBLICATIONS

3 GPP TR 37.834 V0.4.0 (Aug. 2013), "3rd Generation Partnership Project; Technical Specification Group Radio Access Network; Study on WLAN/3GPP Radio Interworking," (Release 12), May 15, 2014, XP050816244, 14 pages.

(Continued)

*Primary Examiner* — Lonnie V Sweet
(74) *Attorney, Agent, or Firm* — Patterson Thuente Pedersen, P.A.

(57) ABSTRACT

A method of operating a network gateway in a cellular network to control access of at least one mobile device to a voice service accessible via the cellular network, the mobile device being connected to the network gateway via a wireless access router and wide area network, WAN, the method including receiving a request from the mobile device to access the voice service; measuring performance metrics for a non-cellular wireless network link to the mobile device; requesting observed network information from the mobile device; and comparing the quality of the non-cellular wireless network link to the mobile device against the respective quality of at least one observed network; if the quality of the non-cellular wireless network link is greater than the quality of an available observed network, allowing the request to proceed to the cellular network; and if the quality of at least one of the observed networks is higher than the current (Continued)

non-cellular wireless network link, rejecting the voice service request of the mobile device.

14 Claims, 10 Drawing Sheets

(51) Int. Cl.
  *H04W 36/14* (2009.01)
  *H04W 36/30* (2009.01)
  *H04W 88/06* (2009.01)

(56) References Cited

U.S. PATENT DOCUMENTS

| | | |
|---|---|---|
| 9,420,510 B1 | 8/2016 | Surmay et al. |
| 9,883,436 B2 | 1/2018 | Brown et al. |
| 10,015,686 B2 | 7/2018 | Townend et al. |
| 10,123,241 B2 | 11/2018 | Brown et al. |
| 10,142,919 B2 | 11/2018 | Brown et al. |
| 10,231,177 B2 | 3/2019 | Ringland et al. |
| 10,356,706 B2 | 7/2019 | Ringland et al. |
| 2001/0055285 A1 | 12/2001 | Tomoike |
| 2003/0134638 A1 | 7/2003 | Sundar et al. |
| 2005/0003857 A1 | 1/2005 | Sylvain |
| 2005/0059400 A1 | 3/2005 | Jagadeesan et al. |
| 2005/0090259 A1 | 4/2005 | Jain et al. |
| 2005/0271021 A1 | 12/2005 | Alemany et al. |
| 2006/0092883 A1 | 5/2006 | Lee et al. |
| 2006/0111112 A1 | 5/2006 | Maveddat |
| 2006/0116127 A1* | 6/2006 | Wilhoite ............... H04W 36/14 455/442 |
| 2006/0217147 A1 | 9/2006 | Olvera-Hernandez et al. |
| 2006/0240828 A1 | 10/2006 | Jain et al. |
| 2007/0008928 A1 | 1/2007 | Kezys |
| 2008/0049738 A1 | 2/2008 | Joung et al. |
| 2009/0010222 A1 | 1/2009 | Jechoux |
| 2009/0046655 A1 | 2/2009 | Zhao et al. |
| 2009/0116443 A1 | 5/2009 | Walker et al. |
| 2009/0215438 A1 | 8/2009 | Mittal et al. |
| 2009/0286534 A1 | 11/2009 | Garg et al. |
| 2010/0003921 A1 | 1/2010 | Godlewski et al. |
| 2011/0002466 A1 | 1/2011 | Kwak et al. |
| 2012/0170548 A1 | 7/2012 | Rajagopalan et al. |
| 2012/0269182 A1 | 10/2012 | Walker |
| 2012/0315905 A1 | 12/2012 | Zhu et al. |
| 2012/0324100 A1 | 12/2012 | Tomici et al. |
| 2013/0102313 A1 | 4/2013 | Tinnakornsrisuphap et al. |
| 2013/0121145 A1 | 5/2013 | Draznin et al. |
| 2013/0324125 A1 | 12/2013 | Bachmann et al. |
| 2014/0118462 A1 | 5/2014 | Zhao et al. |
| 2014/0177600 A1 | 6/2014 | Tsai et al. |
| 2014/0313888 A1 | 10/2014 | Linkola et al. |
| 2014/0334465 A1* | 11/2014 | Lee .................. H04W 48/18 370/338 |
| 2015/0071166 A1* | 3/2015 | Malhotra ............ H04W 48/18 370/328 |
| 2015/0117209 A1 | 4/2015 | Lee et al. |
| 2015/0131619 A1 | 5/2015 | Zhu et al. |
| 2015/0181416 A1 | 6/2015 | Dominguez Romero et al. |
| 2015/0189556 A1 | 7/2015 | Sidhu et al. |
| 2015/0201363 A1* | 7/2015 | Lundqvist ............ H04W 40/12 370/252 |
| 2015/0215832 A1 | 7/2015 | Fitzpatrick |
| 2015/0282013 A1 | 10/2015 | Kim et al. |
| 2015/0312857 A1 | 10/2015 | Kim et al. |
| 2016/0044568 A1 | 2/2016 | White et al. |
| 2016/0057676 A1 | 2/2016 | White et al. |
| 2016/0073286 A1 | 3/2016 | Wang et al. |
| 2016/0095050 A1 | 3/2016 | Lindheimer et al. |
| 2016/0157239 A1 | 6/2016 | Kalderen et al. |
| 2016/0165508 A1 | 6/2016 | Jin |
| 2016/0165518 A1 | 6/2016 | Keller et al. |
| 2016/0165532 A1 | 6/2016 | Nagasaka et al. |
| 2016/0174110 A1 | 6/2016 | Sharma et al. |
| 2016/0183085 A1* | 6/2016 | Yerrabommanahalli ............ H04W 12/04 713/153 |
| 2016/0295385 A1 | 10/2016 | Wang et al. |
| 2016/0316425 A1* | 10/2016 | Cili ................. H04W 48/18 |
| 2016/0337904 A1 | 11/2016 | Hsu et al. |
| 2016/0345256 A1 | 11/2016 | Niranjan et al. |
| 2016/0347298 A1 | 12/2016 | Jung |
| 2016/0373989 A1 | 12/2016 | Tinnakornsrisuphap et al. |
| 2017/0111813 A1 | 4/2017 | Townend et al. |
| 2017/0118091 A1 | 4/2017 | Townend et al. |
| 2017/0134261 A1 | 5/2017 | Seo et al. |
| 2017/0272995 A1* | 9/2017 | Kim ................. H04W 4/24 |
| 2017/0289894 A1* | 10/2017 | Palm ................ H04W 36/14 |
| 2017/0347298 A1 | 11/2017 | Brown et al. |
| 2017/0374597 A1 | 12/2017 | Ray et al. |
| 2018/0124630 A1 | 5/2018 | Ringland et al. |
| 2018/0254979 A1 | 9/2018 | Scahill et al. |
| 2019/0014519 A1 | 1/2019 | Brown et al. |
| 2019/0037339 A1 | 1/2019 | Liu et al. |
| 2019/0069328 A1 | 2/2019 | Sharma |
| 2019/0116540 A1 | 4/2019 | Faus Gregori |
| 2019/0124559 A1 | 4/2019 | Brown |
| 2019/0230132 A1 | 7/2019 | Brown |
| 2020/0236595 A1 | 7/2020 | Cuevas Ramirez et al. |

FOREIGN PATENT DOCUMENTS

| | | |
|---|---|---|
| CN | 104684039 A | 6/2015 |
| CN | 105554855 A | 5/2016 |
| CN | 105722060 A | 6/2016 |
| CN | 105917707 A | 8/2016 |
| CN | 106028409 A | 10/2016 |
| CN | 106134252 A | 11/2016 |
| CN | 106161802 A | 11/2016 |
| CN | 106358254 A | 1/2017 |
| EP | 2900016 A1 | 7/2015 |
| EP | 2925056 A2 | 9/2015 |
| WO | WO-2004102919 A1 | 11/2004 |
| WO | WO-2006138019 A2 | 12/2006 |
| WO | WO-2007076147 A2 | 7/2007 |
| WO | WO-2012145706 A1 | 10/2012 |
| WO | WO-2015150745 A1 | 10/2015 |
| WO | WO-2016004968 A1 | 1/2016 |
| WO | WO 2016/156439 | 10/2016 |
| WO | WO-2017114932 A1 | 7/2017 |
| WO | WO-2017167694 A1 | 10/2017 |
| WO | WO-2017167701 A1 | 10/2017 |
| WO | WO-2018002130 A1 | 1/2018 |
| WO | WO-2018178241 A1 | 10/2018 |
| WO | WO-2018178293 A1 | 10/2018 |
| WO | WO-2018178294 A1 | 10/2018 |
| WO | WO-2018234037 | 12/2018 |
| WO | WO-2018234038 A1 | 12/2018 |
| WO | WO-20182340378 | 12/2018 |

OTHER PUBLICATIONS

3GPP TS 22.173 V7.3.0 (Mar. 2007) "3rd Generation Partnership Project (3GPP); Technical Specification Group Services and System Aspects; IP Multimedia Core Network Subsystem (IMS) Multimedia Telephony Service and supplementary services Stage 1; (Release 7)," 10 pages.

3GPP TS 23.402 V13.4.0 (Dec. 2015) "3rd Generation Partnership Project; Technical Specification Group Services and System Aspects; Architecture enhancements for non-3GPP accesses (Release 13)," 650 Route des Lucioles -Sophia Antipolis Valbonne, Dec. 2015, 298 pages.

Alcatel-Lucent, "Policy Based Terminal Triggered, ANDSF Decided Access Selection," 3GPP draft, S2-081355_ANDSF discussion, Mobile Competence Centre, Athens, Greece, vol. SA WG2, Feb. 2008, 5 pages.

Combined Search and Examination Report for Great Britain Application No. 1710043.9, dated Nov. 20, 2017, 5 pages.

Combined Search and Examination Report under Sections 17 and 18(3) for Great Britain Application No. 1705248.1, dated Aug. 25, 2017, 6 pages.

(56) References Cited

OTHER PUBLICATIONS

Combined Search and Examination Report under Sections 17 and 18(3) for Great Britain Application No. GB1705262.2, dated Oct. 12, 2017, 4 pages.
Ericsson, "Wi-Fi calling—extending the reach of VoLTE to Wi-Fi," Jan. 30, 2015, XP055251865, retrieved on Dec. 26, 2018, 5 pages.
Eronen E., "RFC 4555—IKEv2 Mobility and Multihoming Protocol (MOBIKE)," Nokia, Network Working Group Request for Comments, 4555, Category, Standards Track, XP055299729, Jun. 2006, 34 pages.
European Search Report for Application No. 17177601.6, dated Nov. 17, 2017, 12 pages.
Examination Report for Great Britain Application No. 1710046.2, dated Sep. 26, 2019, 3 pages.
Examination Report for Great Britain Application No. 1710043.9, dated Sep. 25, 2019, 2 pages.
Huawei: "How solutions 1, 2 and 3 work without ANDSF," RAN WG2 #83bis, R2-133444, Ljubljana, Slovenia; Oct. 7-11, 2013, XP050719049, 5 pages.
U.S. Appl. No. 16/498,061, filed Sep. 26, 2019, Inventor(s): Ramirez et al.
U.S. Appl. No. 16/498,546, filed Sep. 27, 2019, Inventor(s): Ramirez et al.
International Preliminary Report on Patentability for Application No. PCT/EP2016/082894, dated Jul. 3, 2018, 9 pages.
International Preliminary Report on Patentability for Application No. PCT/EP2017/057204, dated Oct. 2, 2018, 6 pages.
International Preliminary Report on Patentability for Application No. PCT/EP2017/057225, dated Oct. 2, 2018, 10 pages.
International Preliminary Report on Patentability for Application No. PCT/EP2018/058085, dated Oct. 10, 2019, 17 pages.
International Preliminary Report on Patentability for Application No. PCT/EP2018/058199, dated Oct. 10, 2019, 16 pages.
International Preliminary Report on Patentability for Application No. PCT/EP2018/058202, dated Oct. 10, 2019, 9 pages.
International Preliminary Report on Patentability for Application. PCT/EP2018/064879, dated Jan. 2, 2020, 13 pages.
International Preliminary Report on Patentability for Application No. PCT/EP2018/064878, dated Jan. 2, 2020, 12 pages.
International Preliminary Report on Patentability for PCT Application No. PCT/EP2017/065977 dated Jan. 1, 2019, 8 pages.
International Search Report and Written Opinion for Application No. PCT/EP2016/082894, dated Feb. 17, 2017, 12 pages.
International Search Report and Written Opinion for Application No. PCT/EP2017/057204, dated Apr. 21, 2017, 9 pages.
International Search Report and Written Opinion for Application No. PCT/EP2017/057225, dated May 18, 2017, 13 pages.
International Search Report and Written Opinion for Application No. PCT/EP2018/058085, dated May 17, 2018, 19 pages.
International Search Report and Written Opinion for Application No. PCT/EP2018/064878, dated Jul. 3, 2018, 14 pages.
International Search Report and Written Opinion for Application No. PCT/EP2018/064879, dated Jul. 6, 2018, 17 pages.
International Search Report and Written Opinion for PCT Application No. PCT/EP2017/065977 dated Sep. 6, 2017, 10 pages.
International Search Report for Application No. PCT/EP2018/058202, dated May 2, 2018, 4 pages.
International Telecommunications Union, "G.hn Management and Diagnostics Specifications," Study Period 2009-2012, Study Group 15—Contribution 807, May 2010, 12 pages.
Kaufman, et al., "RFC 7296—Internet Key Exchange Protocol Version 2 (KIEv2)," XP055243756, Oct. 1, 2014, retrieved from the internet http://tools.ietf.org/html/rfc7296#page-58; on Dec. 26, 2018, 143 pages.
Search Report for Great Britain Application No. 1710046.2, dated Nov. 20, 2017, 4 pages.
Siddiqui F., et al., "Mobility Management Across Hybrid Wireless Networks: Trends and Challenges," Elsevier, retrieved from http://www.sciencedirect.com on Oct. 6, 2005, Computer Communications, vol. 29, 2006, 3 pages.
PCT International Search Report for International Application No. PCT/EP2018/058199, dated May 17, 2018, 4 pages.
PCT Written Opinion of the ISA for International Application No. PCT/EP2018/058199, dated May 17, 2018, 14 pages.
EP Search Report for 17164395.0-1854, dated Sep. 22, 2017, 17 pages.
Combined Search and Examination Report for GB application No. 1705257.2, dated Aug. 17, 2017, 2 pages.
Alcatel-Lucent: "Policy based terminal triggered, ANDSF decided access selection", 3GPP Draft; S2-081658_Revision of 1355_ANDSF Discussion V2, 3rd Generation Partnership Project (3GPP), Mobile Competence Centre; 650, Route Des Lucioles; F-06921 Sophia-Antipolis Cedex; France, vol. SA WG2, No. Athens; Feb. 16, 2008, Feb. 16, 2008 (Feb. 16, 2008), XP050263998, 6 pages.
Office Action for Chinese Application No. 201880021005.9, dated Jan. 29, 2021, 14 pages.
Office Action for Chinese Application No. 201880022391.3, dated Feb. 26, 2021, 13 pages.
Office Action for Chinese Application No. 201880022734.6, dated Feb. 2, 2021, 7 pages.
RAN2 "Reply-LS on "subscriber type" indication via 51," 3GPP TSG RAN WG3 Meeting #59, Feb. 15, 2008, R2-075458, 1 page.
S2-080718, "Subscriber Type on 51," 3GPP TSG SA WG2 Meeting #62 Marina Del Rey, USA, Jan. 14-18, 2008, 2 pages.
Communication pursuant to Article 94(3) EPC for European Application No. 18713692.4, dated Dec. 22, 2020, 7 pages.

* cited by examiner

ACCESS NETWORK SELECTION

CROSS-REFERENCE TO RELATED APPLICATIONS

The present application is a National Phase entry of PCT Application No. PCT/EP2018/058199, filed Mar. 29, 2018, which claims priority from European Patent Application No. 17164395.0 filed Mar. 31, 2017, each of which is fully incorporated herein by reference.

TECHNICAL FIELD

The present disclosure relates to wireless data networks and in particular to a method for managing voice service access.

BACKGROUND

Cellular Networks

Cellular data networks provide data connectivity to mobile devices such as mobile phones and smartphones having cellular network interfaces.

The network is formed of a network core for handling control plane functions and data packet routing, and a radio access network (RAN) of macrocell base stations located throughout the coverage area of the mobile network for wireless communication with subscriber user entities (UEs) such as mobile phone and smartphone devices. An example of a cellular network architecture is Long Term Evolution (LTE). Unlike older second generation (2G) and third generation (3G) cellular networks which offer packet switched data services on top of a circuit switched voice platform, LTE is an all-packet switched data network architecture that does not support a traditional voice calling platform.

Voice over LTE (VoLTE) is a packet switched voice service provided by a voice service (MMTel) hosted by application servers in an Internet Multimedia Service (IMS) associated with a cellular network. Voice data is carried between a UE and the voice service via an LTE network as a set of data packets with strict Quality of Service parameters relating to latency and delay. VoLTE aims to reduce the reliance on legacy cellular Circuit Switched Fall Back (CSFB) and Voice over IP services. This will reduce operating overheads and may allow parts of the legacy 2G and 3G platforms to be switched off.

WLAN

Wireless local area networks (WLANs) operating in accordance with the Institute of Electrical and Electronics Engineers (IEEE) 802.11 family of standards (commonly referred to as Wi-Fi™) are common in many user locations and provide data connectivity over a small geographic range. Typically the wireless local area network is generated by a wireless access point which also acts as a packet routing interface between Wi-Fi client devices connected to the WLAN (e.g. smartphones, tablets) and local devices connected via a wired interface (televisions, network attached storage). The wireless access point serves local network devices and will typically be co-located, or integrated with an external network interface such as a modem for providing a "broadband" backhaul link to external networks such as the Internet via an Internet Service Provider's core network.

Example user premises broadband technologies include Digital Subscriber Line (xDSL) copper/fibre and cable based on the Data over Cable Service Interface Specifications (DOCSIS) architecture.

Such a combined wireless access point, routing and modem device will be referred to as a hub throughout the description.

VoLTE/VoWiFi

Cellular signal strength varies according to distance from the transmitter but also due to the presence of obstructions and sources of interference. In buildings or other enclosed areas, the cellular signal can be attenuated such that data communication is not possible. These types of locations are sometimes referred to as coverage gaps.

Due to the prevalence of WLANs in many indoor areas where cellular coverage may be locally weak, Wi-Fi offload is often used to transport UE packet data into the cellular network. Voice over Wi-Fi (VoWiFi) or Wi-Fi Calling service has also been deployed by several network operators as an extension of the Wi-Fi Offload concept to voice data. In VoWiFi, the voice dialer client in the UE links to the same MMTel voice service used in VoLTE and therefore VoWiFi can be regarded as an alternative data path between the UE and the voice service in the IMS. In particular, the WLAN used by the UE for VoWiFi is treated as a non-3GPP access network to the LTE network. Voice calls are made and received using the standard telephony client software and data packets carrying voice data are tunneled to and from a publically accessible network gateway of the cellular network core known as an evolved packet data gateway (ePDG).

VoWiFi extends the cellular network reach to indoor locations where the cellular signal is traditionally weaker and furthermore allows handover to a normal VoLTE or legacy voice services when the mobile device moves to an outdoor location.

VoLTE and VoWiFi are available to UEs such as smartphones having both a cellular network interface and a WLAN interface for data connectivity. In conventional systems the UE has an access network selection policy which can be configured on the device to either prioritize connecting to a WLAN network over a cellular network or vice-versa (i.e. to prefer cellular access over WLAN). Similarly, the UE can decide whether to connect to VoLTE or VoWiFi for voice services based on the availability of a WLAN and/or a cellular access network. If a WLAN is available and WLAN has been set as preferred access, the UE will attempt to connect to the VoWiFi service by establishing a secure communication tunnel to the ePDG of the subscriber cellular network. Once established, the mobile device will establish a session with the MMTel voice service in the IMS to implement VoWiFi.

Cellular network operators see this behavior as advantageous because it offloads traffic from the radio access network of their cellular network onto a non-3GPP network thereby freeing up network resources.

However, this simplistic access network selection behavior in UEs can lead to bad quality calls or calls being missed due to the assumption by the UE is that the WLAN and VoWiFi link will always be more stable and higher performing than the cellular environment.

VoWiFi services can suffer from Quality of Experience (QoE) issues if the network selected is not suitable due to congestion amongst other issues. Conventional mechanisms to select the best access network for voice services are based mostly on device decisions based on static policies or basic dynamic information received from the network (e.g. Wi-Fi signal strength), but visibility is limited to the information available to the device and the mechanisms that have been implemented on each specific device type (i.e. dependent on device manufacturer implementation).

SUMMARY

Embodiments of the present disclosure relate to these issues.

In one aspect, an embodiment provides a method of operating a network gateway in a cellular network to control access of at least one mobile device to a voice service accessible via the cellular network, the mobile device being connected to the network gateway via a wireless access router and wide area network, WAN, the method comprising: receiving a request from the mobile device to access the voice service; measuring performance metrics for a non-cellular wireless network link to the mobile device; requesting observed network information from the mobile device; and comparing the quality of the non-cellular wireless network link to the mobile device against the respective quality of at least one observed network; if the quality of the non-cellular wireless network link is greater than the quality of an available observed network, allowing the request to proceed to the cellular network; and if the quality of at least one of the observed networks is higher than the current non-cellular wireless network link, rejecting the voice service request of the mobile device.

In another aspect, an embodiment provides an apparatus for controlling access of at least one mobile device to a voice service accessible via a cellular network the mobile device being connected to the network gateway via a wireless access router and wide area network, WAN, comprising: a wide area network interface; a secure data tunnel controller for receiving a request from the mobile device to access the voice service via the wide area network interface; means for measuring performance metrics for a non-cellular wireless network link to the mobile device; means for requesting observed network information from the mobile device; and means comparing the quality of the non-cellular wireless network link to the mobile device against the respective quality of at least one observed network; an access controller configured to: allow the request to proceed to the cellular network, if the quality of the non-cellular wireless network link is greater than the quality of an available observed network; and reject the voice service request of the mobile device, if the quality of at least one of the observed networks is higher than the non-cellular wireless network link.

BRIEF DESCRIPTION OF THE DRAWINGS

Embodiments of the present disclosure will now be described with the aid of the accompanying Figures in which.

DESCRIPTION

System Overview

Figure 1:
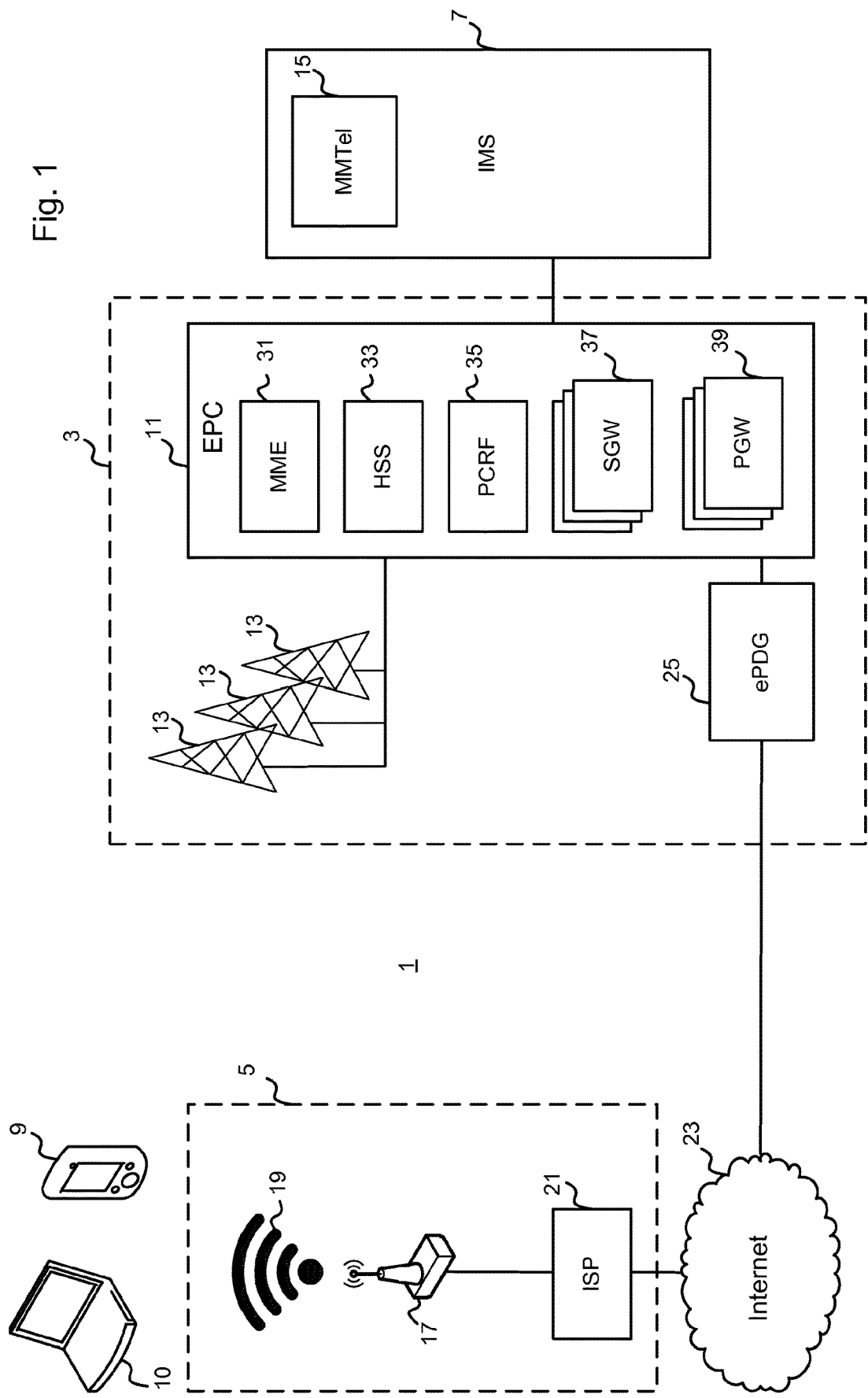
FIG. 1 schematically shows an overview of a telecommunications system according to a first embodiment.

FIG. 1 shows an overview of the main components in a telecommunications communication system 1 according to the first embodiment. The system 1 has several functional subsystems:

a Long Term Evolution (LTE) cellular network 3 infrastructure;

non-cellular network infrastructure 5 including a local network and Internet Service Provider (ISP) architecture; and an IP Multimedia Subsystem (IMS) 7.

The LTE cellular network 3 provides cellular network client devices, known as User Entities (UE) such as mobile telephones 9 with data and voice services using a packet-switched IP network in contrast to the older circuit switched networks. The LTE cellular network 3 includes a network core 11 and a radio access network formed of eNodeBs 13 for connecting services and resources in the network core 11 to the UEs 9. The network core 11 contains control functions such as a Multimedia Mobility Entity (MME) 31, a Home Subscriber Server (HSS) 33, and a Policy Configuration Rules Function (PCRF) 35. For routing data packets into and out of the network core, there are a number of Serving Gateways (SGW) 37 connected to the eNodeBs 13 and Packet Gateways (PGW) 39 connected to external resources such as the Internet 23 and the IMS 7.

The IMS 7 is an IP data network which provides a unified service architecture for all networks. Multiple services can be provided on a single control/service layer even though the access networks may be different. The IMS 7 therefore reduces the need for duplication in data services/applications. The VoLTE and VoWiFi voice calling services are hosted in an application server 15 within the IMS 7 which in this embodiment is provided by a service known as the Multimedia Telephony Service (MMTel).

The non-cellular network infrastructure 5 includes a wireless access point/modem router device 17, hereinafter referred to as a hub, located in a user premises such as a user's home, generating a wireless local area network (WLAN) 19 in accordance with the IEEE 802.11 family of standards, in this embodiment 802.11ac, to allow communication with UEs 9 and also WLAN only devices such as a computer 10. For external network access, the hub 17 communicates with an Internet Service Provider (ISP) 21 which routes data via a wide area network such as the Internet 23 to external servers and users.

Due to the ability of the LTE cellular network 3 to allow UEs 9 to access the network core 11 services via a non-cellular network such as a WLAN 19, the LTE cellular network 3 also includes an Evolved Packet Data Gateway (ePDG) 25 which acts as a termination point for secure data tunnels, in this case using the IP Security (IPSec) protocol, with the UE 9 over non-trusted $3^{rd}$ Generation Partnership Project (3GPP) systems. This allows UE data to be routed into the EPC network core 11 for processing within the LTE cellular network 3 and IMS 7 network.

The UE 9 has both WLAN and LTE radio interfaces for accessing the non-cellular network infrastructure and the LTE cellular network respectively and the UE 9 supports VoLTE, VoWiFi and CSFB voice calls. To highlight the difference between UEs 9 and other connected WLAN devices 10, the computer 10 only has a WLAN interface and therefore can only access the WLAN 19 of the hub 17 but not the cellular network 3 since it does not have an interface capable of sending and receiving LTE signals.

Behavior of UE for Using the WLAN and LTE Interfaces

As mentioned above, the UE 9 has both WLAN and LTE interfaces and is capable of both VoLTE and VoWiFi call handling. Since an eNodeB 13 of the LTE network has a larger geographical coverage range than a WLAN 19, in most areas the UE will be connected to the LTE network 3 and will use VoLTE.

However, when the UE is within range of a WLAN 19 such as shown in FIG. 1, there is overlap in the connectivity ranges, and the UE 9 could connect to data services using either the cellular interface or the WLAN interface. A typical default UE policy is that a WLAN connection is preferred. So when a UE is connected to the LTE network and it detects a known WLAN, the UE will try to use the WLAN for data services.

Therefore upon detection of a known WLAN, the UE 9 will enable its WLAN interface and disable its cellular interface causing any existing cellular services to also be disconnected. This change is generally transparent to the user of the UE as it has little impact to the operation of services such as file transfers and web browsing. However, the general UE policy of preferring WLANs to cellular data interfaces can have an impact on the Quality of Experience for users of voice services using VoWiFi instead of VoLTE.

In the first embodiment, the Wi-Fi access point performs a network selection decision on behalf of the UE based on any available information relating to the presence and connection quality of alternative networks available in order to steer the UE to a network which provides the best path to the voice service. In particular, even when VoWiFi is available via the Wi-Fi access point, the connection may be steered to VoLTE if the quality of the VoWiFi connection is deemed to be insufficient to provide voice access.

Hub

Figure 2:
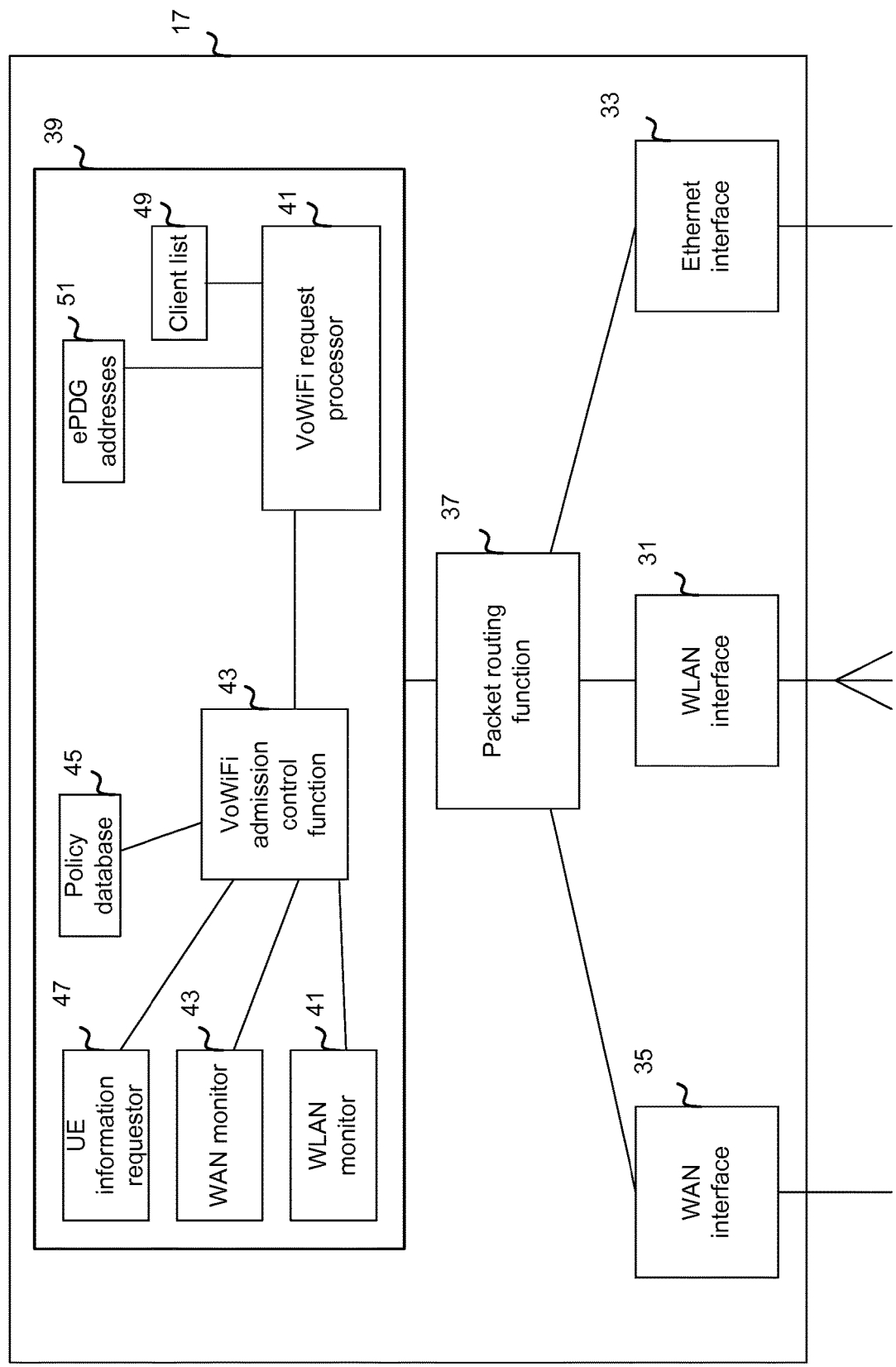
FIG. 2 schematically shows the functional components of a wireless routing device according to a first embodiment.

FIG. 2 shows the internal components of the hub 17 in the first embodiment.

The hub 17 contains a number of network interfaces for communication with various types of network device. For wireless local devices, there is a Wireless Local Area Network (WLAN) interface 31 for communication with wireless devices using a wireless protocol such as the IEEE 802.11 family of wireless LAN standards known as Wi-Fi. In this embodiment, the WLAN interface 31 is compliant with the 802.11ac Wi-Fi standard for WLAN operation. For wired LAN devices there is an Ethernet interface 33 in accordance with the IEEE 802.3 standards.

For connectivity to the Internet Service Provider (ISP), the hub 17 has a Wide Area Network (WAN) interface 35 which in this embodiment is a modem compliant with the Digital Subscriber Line (xDSL) family of standards such as Very High Speed DSL (VDSL) modem.

The hub 17 also contains a central processor and memory (not shown). The memory contains computer program code which, when executed by the processor, define a number of software functional units which are described below.

The hub 17 contains a packet routing function 37 which is responsible for managing the flow of data packets between the three interfaces 31, 33, 35. The packet routing function 37 processes the headers of incoming packets received on the three interfaces 31, 33, 35 and determines where to send the packets for onward delivery to the intended packet destination. The packet routing function 37 will also include functions such as Network Address Translation (NAT) for directing packets between the local interfaces 31, 33 and the WAN interface 35.

The hub 17 contains a VoWiFi monitor function 39 which is responsible for determining whether a UE should be allowed to use a VoWiFi service provided by its cellular network provider. The VoWiFi monitor function 39 is configured to process requests for VoWiFi service from a UE 9 and either allow or deny the registration request in accordance with an assessment of the VoWiFi network requirements with regard to the presence of alternative networks.

In this way, the hub 17 acts as an admission controller to devices requesting VoWiFi and selectively allows access to VoWiFi in accordance with whether a VoWiFi session is the most suitable network.

The VoWiFi monitor function 39 has a VoWiFi request detection function 41, an admission control decision function 43, a policy database 45 and a network device status query function 47.

The VoWiFi request detection function 41 is linked to the WLAN controller 31 and also an ePDG public address store 51 and a connected client list 49. The VoWiFi request detection function 41 is configured to monitor the data travelling between the WLAN interface 31 and the WAN interface 35. In particular the function is looking for traffic directed to the ePDG 25 of the cellular network associated with the UE 9.

The VoWiFi request detection function 41 processes flows of data packets traversing the hub to identify the subset of data packets which are addressed to the IP address of the ePDG for that UE's 9 cellular network.

Once a new request is detected, the admission control decision function 43 is notified and is operable to determine whether the request for VoWiFi should be allowed. The admission control decision function 43 first notifies a network device status query 47 with the address of the UE 9.

The network device status query function 47 carries out two processes, firstly it instructs the identified UE to scan for any available networks present via its Wi-Fi and cellular network interfaces. In addition to the list of available networks, performance metrics are also included in the UE's response.

Once retrieved, the admission control decision function 43 processes the performance metrics in conjunction with threshold values pre-stored in a policy database 45 to determine the quality of each detected network. After processing, if the VoWiFi link is deemed to be the most suitable available network, the VoWiFi request is forwarded to the ePDG so that a VoWiFi session can be established in a conventional manner.

However, if the performance of the VoWiFi path is lower than an alternative detected WLAN or cellular network, then the request is denied and the admission control decision function 43 will send a message to the UE notifying it of the identity of the most suitable network.

In response to the notification, the UE will initiate a connection to the recommended network.

Overall Operation of the System

Figure 3:
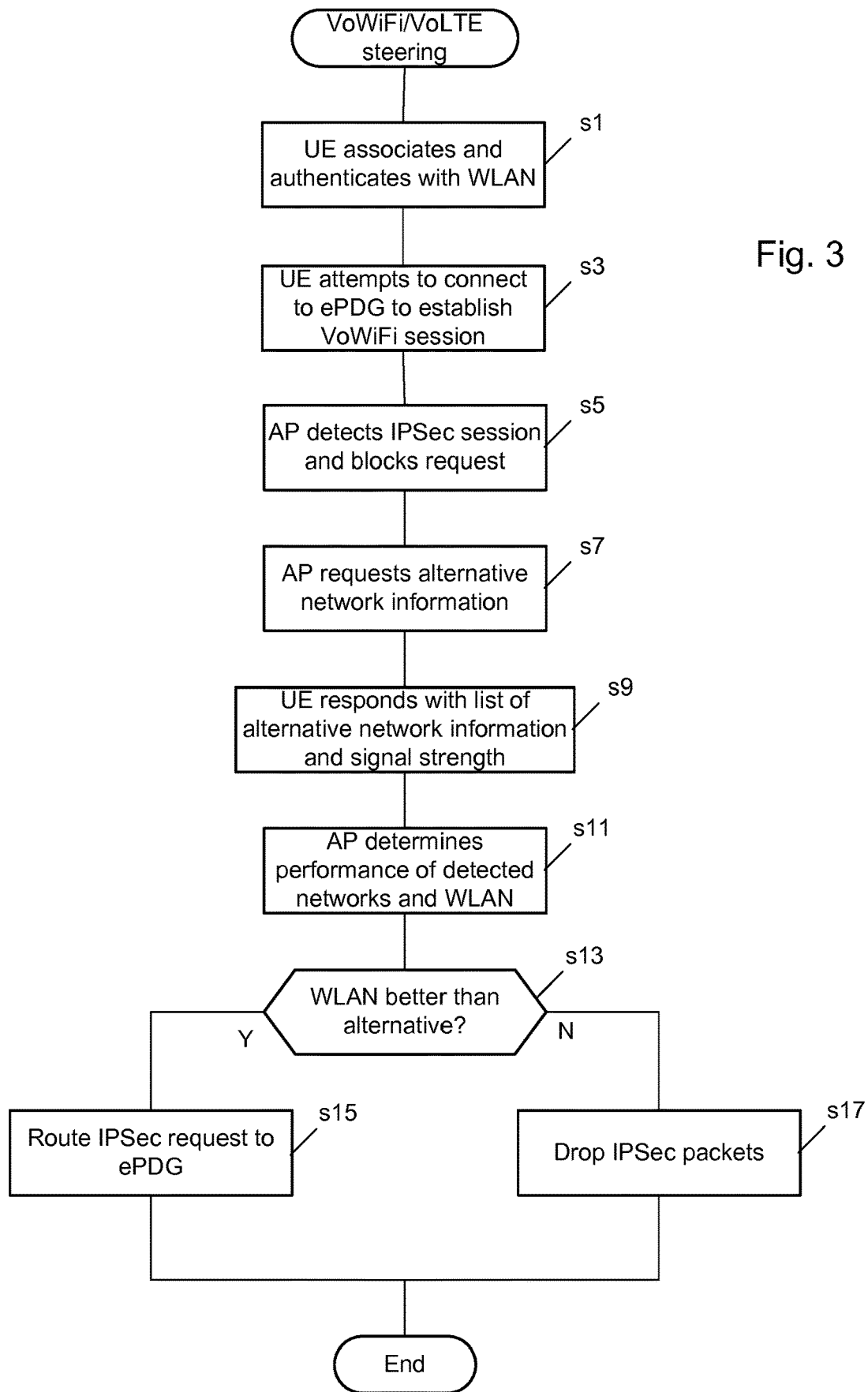
FIG. 3 is a flowchart showing the overall processing carried out by the wireless routing device and a user entity in the first embodiment.

FIG. 3 shows a flowchart of the overall steps carried out by the various components in the first embodiment.

The process begins at the UE 9. In s1, as is conventional, when the mobile device's WLAN controller is enabled and detects the presence of a WLAN, the UE's existing access network selection mechanism will select Wi-Fi as the preferred radio access network (RAN) and initiate a connection to the WLAN.

In s3, once the UE has associated and authenticated with the WLAN, the UE will initiate registration onto the VoWiFi service by sending a request to the ePDG in order to establish a secure data tunnel in accordance with the IP Security (IPSec) standard into the cellular network core 11.

In accordance with the first embodiment, the VoWiFi request detection function 41 of the wireless access point is configured to detect the initial message containing the IPSec request from the mobile device to the ePDG. In s5, once a request has been detected, the wireless access point will delay forwarding the IPSec request to the destination ePDG until it has determined whether an alternative access would be suitable for VoWiFi services.

In s7 the network device status query function 47 of the wireless access point communicates with a client on the mobile device. A request is sent asking for additional information from the mobile device, in particular to identify any other radio networks (cellular and/or non-cellular Wi-Fi) networks are visible to the mobile device.

In s9, the UE scans for alternative networks (cellular networks and WLANs) and responds to the hub with any alternative network information including at least a network identifier and observed signal strength information.

In s11, the admission control decision function 43 of the hub evaluates the quality of the observed available networks. More details of this activity will be provided below.

In s13, the quality of the VoWiFi link via the current WLAN and the quality of the best alternative network are compared.

If the quality score of the VoWiFi link is higher or the same as the cellular network score, then in s15 the IPSec request is forwarded to the ePDG so that the mobile device can register for VoWiFi service.

However, if the quality of the cellular signal is determined to be higher than the quality score for the VoWiFi link, then in step s17 the admission control function will select the cellular network and therefore the IPSec request is dropped. This will cause the UE to assume that VoWiFi is not available when no IPSec response is received before a time out period.

Furthermore, the admission control function will provide the identity of the recommended alternative network used in the quality assessment as the network to be used by the UE for voice service. A message containing the identity of the alternative network is transmitted from the admission control function to the client running on the UE.

Once the UE has received the notification along with the timeout of the IPSec request, the UE is configured to connect to the recommended network for voice services.

Further details of the operational steps in FIG. 3 will now be described.

s5—VoWiFi Request Detection

Figure 4:
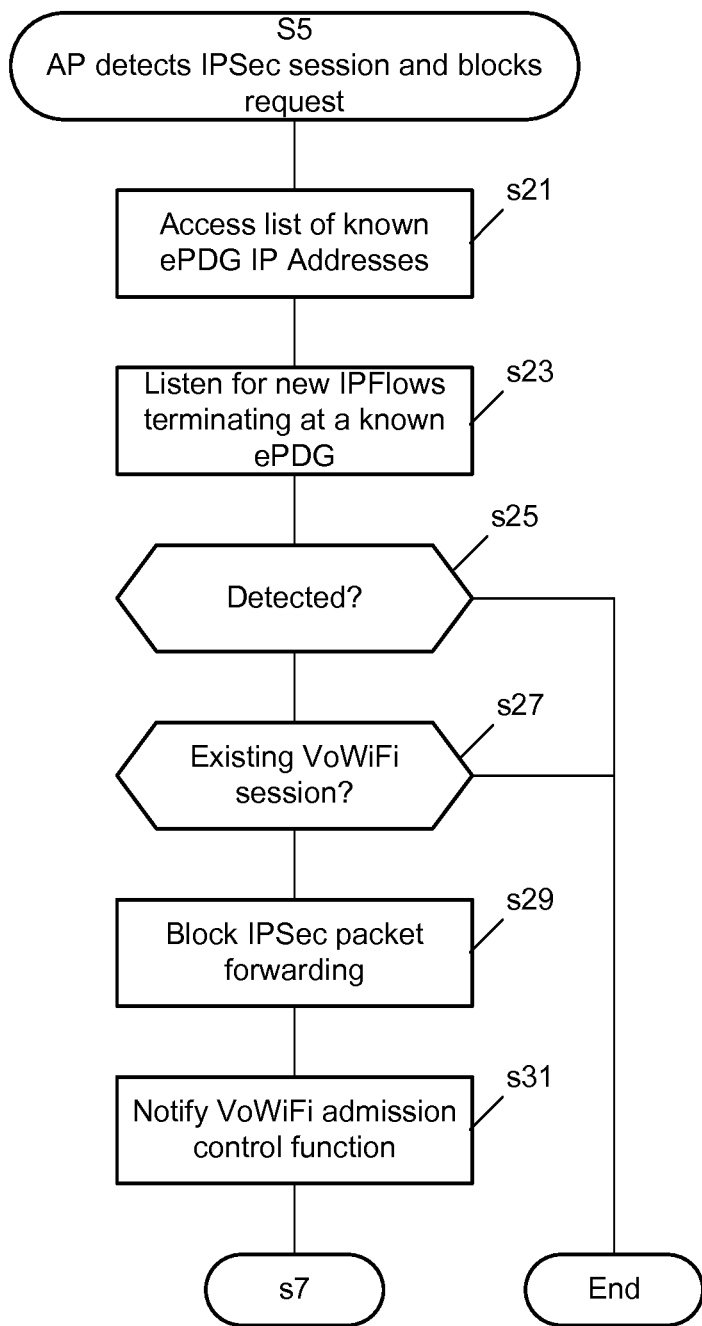
FIG. 4 is a flowchart showing the processing of s5 of FIG. 3 in more detail.

FIG. 4 is a flowchart showing the processing of s5 in more detail.

In this embodiment, the VoWiFi request detection function 41 in the hub is configured to use IP Flow detection to detect the submission of a new request from the UE to connect to an ePDG associated with the UE.

In s21, the VoWiFi request detection function 41 accesses a pre-stored list of ePDG IP addresses corresponding to cellular networks that are available in the area of the hub. The ePDGs are edge gateways of the cellular network that allow devices on non-trusted 3GPP networks to access cellular core network services and resources, such as the MMTel voice service residing on the IMS. ePDGs are therefore publically accessible to devices located on public networks such as the Internet.

Once the list has been loaded, in s23 the VoWiFi request detection function 41 monitors incoming packets received from the WLAN interface of the hub to listen for new IP Flow sessions between a UE connected to the hub's WLAN and a known ePDG. This is achieved by analyzing the source and destination addresses in the headers of incoming IP packets. When a new packet is received from the UE in s25 the VoWiFi request detection function checks to see whether the destination field in the packet header is addressed to a known ePDG address.

If the packet is not addressed to an ePDG, then the ePDG detection processing ends and the packet is routed as normal to its destination.

If the test determines that the packet is addressed to a known ePDG IP address, in s27, the VoWiFi request detection function next checks the existing VoWiFi client list 49 to determine whether the packet is part of an existing IP Flow that has already been recorded as an existing VoWiFi session. If the packet does correspond to an existing VoWiFi IP Flow to an ePDG, processing ends and the packet is forwarded as usual. However, if the packet does relate to a new IP Flow for VoWiFi, in s29 the packet is blocked by the wireless access point and in s31 the VoWiFi admission control function is notified that the processing of the first embodiment to determine the optimal radio access network is required and then processing moves to s7.

In s7 as shown in FIG. 3, the hub requests alternative network information from the UE. The interaction with the UE to provide such information will be discussed after the overall processing of the hub has been described.

s9—Receive Reply from UE

In this embodiment, the UE will respond with a set of available networks in a manner that is similar to the response sent to a cellular network eNodeB during cellular handover.

Examples of UE responses are set out below.

Example 1

A number of different alternative networks are returned including LTE networks, a Wi-Fi network and a legacy 3G network which can provide voice services using CSFB.

| Detected Network | Signal Strength (dBm) | Frequency (Mhz) |
| --- | --- | --- |
| LTE 1 | −77 | 800 |
| LTE 2 | −80 | 3200 |
| Wi-Fi 1 | −30 | 2412 (2.4 Ghz Wi-Fi Channel 1) |
| HSPA | −70 | 1900 |

Example 2

No other alternative networks are detected.

| Detected Network | Signal Strength (dBm) | Frequency (Mhz) |
| --- | --- | --- |
| — | — | — |

Example 3

A low signal strength alternative network is located.

| Detected Network | Signal Strength (dBm) | Frequency (Mhz) |
|---|---|---|
| LTE 1 | −120 | 2600 |

Once the UE has replied to the query from the network device status query function 47 with a list of observed networks and any measured metric data about those networks, the admission control decision function 43 processes the collected data to determine whether to allow the connection to VoWiFi.

s11—Determine Performance of Local and Alternative Networks

Figure 5:
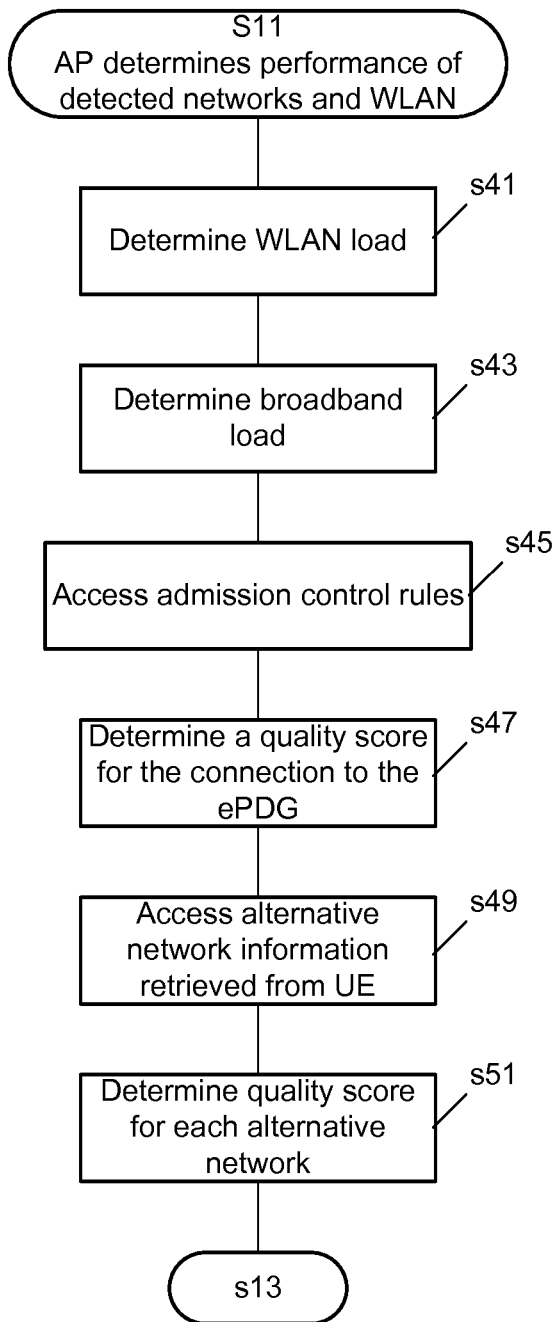
FIG. 5 is a flowchart showing the processing of s11 of FIG. 3 in more detail.

FIG. 5 is a flowchart showing the processing of s11 in more detail.

As mentioned above, a VoWiFi link between a UE and IMS voice service is formed of several separate networks. Namely a local WLAN between the UE and hub, a public network broadband link between the hub and ePDG, and a private cellular network link between the ePDG and the IMS. To evaluate the quality of the VoWiFi link, the admission control function 43 obtains performance metrics for two of the component links, namely the WLAN and the broadband sections to derive a quality for the VoWiFi link. In this embodiment, it is assumed that the cellular network core 11 will not be performance limiting to the VoWiFi service.

In s41, the admission control function 43 determines the WLAN link quality by comparing the current status of the WLAN against a set of thresholds, stored in the policy database 45. The load of the WLAN is determined based on, for example, the number of connected WLAN devices and the current throughput of the WLAN. For example, if the hub does not have any active data sessions, then the quality of the WLAN is deemed to be high. Alternatively, if there are multiple high definition video streaming sessions or file transfers, then the quality is deemed to be low.

Once the WLAN performance has been measured, in s43, the admission control function 43 determines the current performance of the broadband link by sending a series of ping requests to a server of the broadband network or the Internet. In this embodiment, the ping requests are sent to the ePDG by the UE. The response packets will provide information about the delay, jitter and packet loss experienced on the link. These metrics are compared against respective thresholds stored in the policy database 45 to determine whether the broadband link is sufficient to carry VoWiFi sessions.

In s45, the admission control function determines whether the current number of VoWiFi sessions established via the hub is higher than a threshold. For example, the network operator policy defines a threshold number of three active VoWiFi sessions.

In s47, the information from the WLAN link, broadband link and VoWiFi session tests are combined and mapped to a quality score reflecting the ability of the WLAN and broadband link to the ePDG to carry VoWiFi calls. In particular, the worst performing aspect of the VoWiFi link will be identified as the rate limiting step. In general, if both the WLAN and broadband links are performing at a high level, then the final quality score will be high. However, if the WLAN link is lightly loaded but the broadband link appears to be congested, the final score will be low to reflect the bottleneck imposed by the broadband link. Alternatively, if the broadband link is performing well but the WLAN link is congested, the final score is also low, this time to reflect the WLAN bottleneck.

s41 to s47 allow the admission control function to determine information about the local environment's ability to support a VoWiFi session. The hub cannot however determine information about the environment of the UE since it is in a different location and does not have cellular network interfaces.

Therefore, in s49, the information about alternative networks visible to the mobile device is retrieved from the network device status query function and in s51 a quality score is derived for each of the detected networks.

This quality score is derived using a respective conversion table suitable for each radio access network technology.

Example signal strength to quality conversion table for LTE networks, HSPA networks and Wi-Fi networks are shown below.

| Example mapping table for LTE | |
|---|---|
| RSRP | Score |
| >−90 dBm | 4 |
| −90 dBm → −105 dBm | 3 |
| −106 dBm → −120 dBm | 2 |
| <−120 dBm | 1 |

| Example mapping table for 3G | |
|---|---|
| RSSI | Score |
| >−70 dBm | 4 |
| −70 dBm → −85 dBm | 3 |
| −86 dBm → −100 dBm | 2 |
| <−100 dBm | 1 |

| Example mapping table for Wi-Fi | |
|---|---|
| RSSI | Score |
| <−55 dBm | 4 |
| −55 dBm → −75 dBm | 3 |
| −76 dBm → −85 dBm | 2 |
| −86 dBm → −96 dBm | 1 |

Applying the mappings to the detected alternative networks shown in example table 1:

| Network | Signal Strength | Quality |
|---|---|---|
| LTE 1 | −77 dBm | 4 |
| LTE 2 | −80 dBm | 4 |
| Wi-Fi 1 | −30 dBm | 4 |
| HSPA | −70 dBm | 3 |

Following the conversions, the alternative network having the highest score is selected and processing returns to s13 where the quality of the WLAN/broadband link is compared against the quality of the selected alternative network. In the case of example scan 1 above, LTE1 is chosen as the alternative network candidate because it has a slightly higher signal strength despite being mapped to the same quality score.

Returning to s13 in FIG. 3, in the example, the VoWiFi link has been assigned a score of 4, and the alternative network score is also 4.

Therefore processing proceeds to s15 because the VoWiFi link score is the same as the alternative network score and therefore there will be no benefit to switching to the alternative network.

In s15, the IPSec request from the UE is forwarded to the ePDG so that the UE can register for VoWiFi. The VoWiFi client list is also updated with the new entry of existing VoWiFi sessions and processing ends.

However, if there were detected problems in at least one of the VoWiFi link segments, then in s13 the alternative network LTE1 would be chosen as the higher performing network. In s17 the IPSec request from the UE would be dropped within the hub and the network identifier for LTE1 is provided to the UE.

Once the UE receives this network identifier, it will disassociate from the WLAN and connect to the eNodeB of LTE1 and connect to the voice service using VoLTE.

UE Operations to Provide Alternative Network Information

Returning to FIG. 3, the early interaction between the hub and the UE will be described with reference to FIG. 6.

Figure 6:
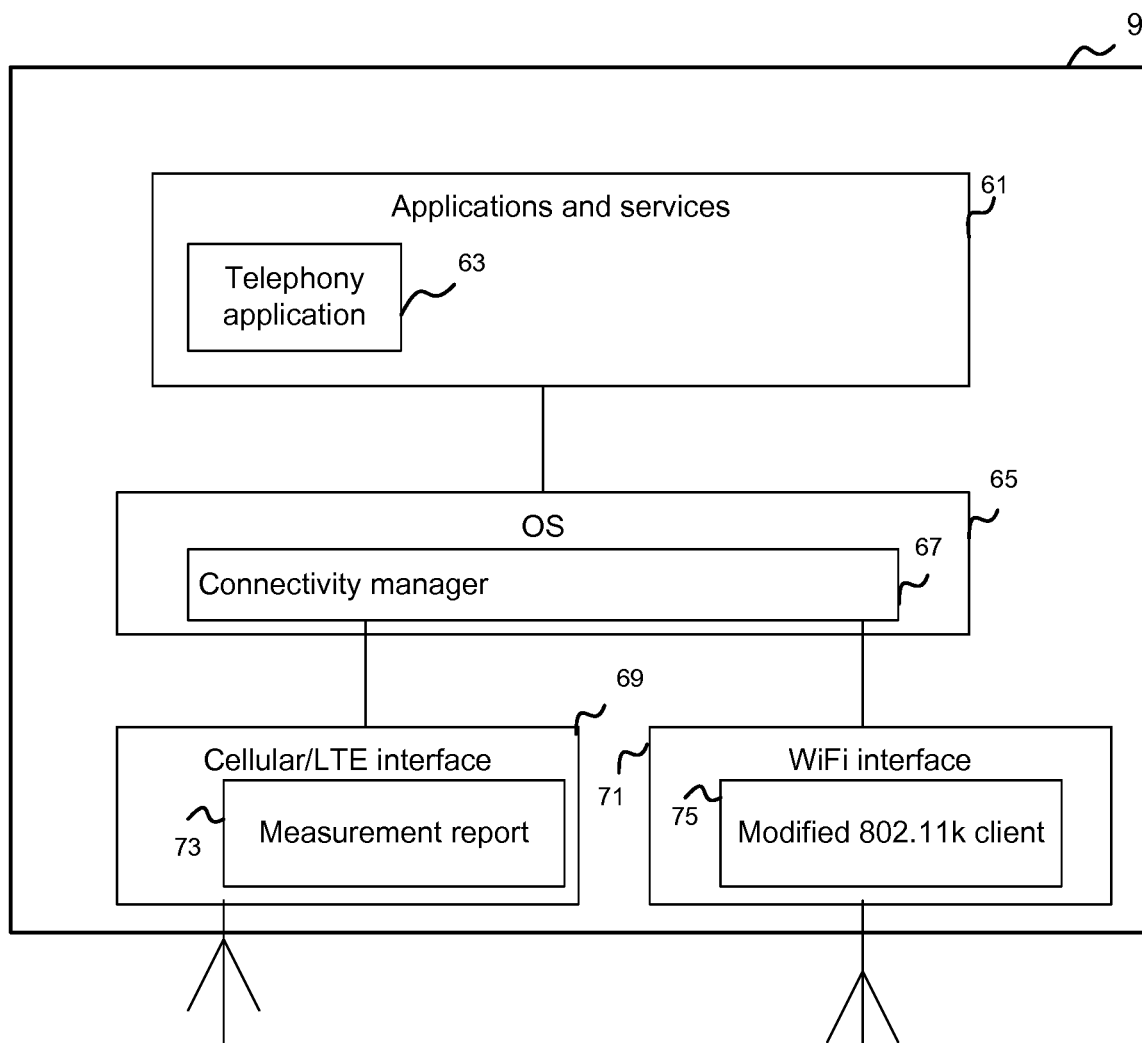
FIG. 6 schematically shows the functional components of a UE illustrated in FIG. 1 in the first embodiment.

FIG. 6 schematically shows the functional components of a UE in accordance with the first embodiment.

When computer code instructions stored on a data store are executed by a UE processor, the UE 9 can be regarded as a number of distinct functions. At the user level, applications and services 61 provide voice and data functionality to the end user. A telephony dialer application 63 is shown as an example of a voice service. Other apps include web browsers, camera, GPS applications and VoIP services.

An Operating System 65 provides an environment for the applications 61 and is also responsible for abstracting the software from the specifics of any hardware of the UE9 such as screen, compass, keyboard/user input etc (not shown).

For data exchange with external resources, a connectivity manager 67, which in this embodiment is part of the OS 65, manages a number of data network interfaces for communication with external resources. The connectivity manager 67 is connected to a cellular network interface 69, in this case an LTE modem 69, and also a Wi-Fi WLAN interface 71, in this case compliant with IEEE 802.11ac.

The connectivity manager 67 is responsible for managing access to the connected interfaces so that an appropriate interface is used to transport data generated by and addressed to applications and services. In this way, the applications do not need to be aware of which data interface is used, they only need to know if a data connection is available.

The LTE modem 69 communicates with an eNodeB 13 of the LTE network 3 to access resources such as the MMTel service.

The WiFi interface 71 communicates with the hub 17 via the WLAN 19 generated by the hub 17.

The LTE modem 69 and WiFi-interface 71 therefore provide a respective data link for carrying data packets generated by applications running on the UE 9. In the context of voice services, VoLTE is used when voice data travels via the LTE modem 69 and cellular radio access network of eNodeBs 13 and VoWiFi is used when voice data travels to the ePDG 25 via the Wi-Fi interface 71, WLAN 19, hub 17 and broadband network including the ISP 21 and Internet 23.

One of the advantages of wireless communications is UE mobility. The locations of eNodeBs 13 and hubs 17 are generally fixed but the UEs can move around a defined range and still maintain connectivity to the respective network access.

Furthermore, in LTE, when a UE is engaged in a voice call session and has also moved far away from the serving eNodeB 13, the serving eNodeB will perform a handover procedure to select another eNodeB 13 located in a better geographic location to serve the UE. As part of this process, the serving eNodeB will request a measurement report from the UE for intra-frequency, inter-frequency and inter-RAT (Radio Access Technology) carriers. This information is generated by the UE and stored in a measurement report store 73 for transmission to the serving cell. Based on the information in the measurement report, the serving eNodeB will identify and select a new handover eNodeB to serve the UE at its new location.

In contrast, traditionally Wi-Fi generally relies on a client dictated handoff process. When a UE is connected to a WLAN of a wireless access point (AP) or a combined wireless access point device such as a hub, the UE monitors the signal strength of the wireless connection using a Received Signal Strength Indicator (RSSI) metric. When the connection drops below a threshold strength, the UE sends out probe packets to discover new surrounding APs. Any probe responses from surrounding APs are used to select a handoff AP, typically the one having a highest signal strength.

Once selected, the UE associates and authenticates with the selected AP.

To improve the handoff procedure, the IEEE 802.11k standard defines an AP assisted roaming method in which the AP can scan for neighboring APs and send this Neighbor Report to connected UEs to aid in their handoff decision.

When a UE is connected to an AP WLAN, the AP monitors the connection signal strength to the UE. When the signal strength drops below a certain threshold, this is indicative that the UE is moving away from the UE, or a source of interference is present to disrupt the connection.

The AP will send a control message to the UE as a warning that a handoff may be required and in response, the UE may request the Neighbor Report and use the neighbor AP information as the basis of the handoff decision.

In this embodiment, this neighbor report scan and availability is applied to the UE.

UE Operation in Response to s7—Request Alternative Network Information from UE

The network status function 49 of the hub 17 is configured to communicate with a modified 802.11k client 75 running on the UE 9 using a message exchange process operating in accordance with a modified version of the IEEE 802.11k protocol.

In addition to requesting information about neighboring Wi-Fi networks per 802.11k, the hub also requests information on cellular networks such as Radio Access Technology, frequency band and signal strength observed by the UE.

The modified 802.11k client 75 provides several additional functions over a standard 802.11k UE client.

In a standard 802.11k client, the client requests neighbor reports from an AP. The modified 802.11k client 75 generates neighbor reports to record the presence of surrounding APs and also allows the generated neighbor reports to flow in the opposite direction, namely from the client to the AP/hub.

Furthermore, the connectivity manager 67 is linked to the modified 802.11k client and the measurement report 73 on the cellular interface 69 to enable the neighbor report to also include cellular networks within range.

Figure 7:
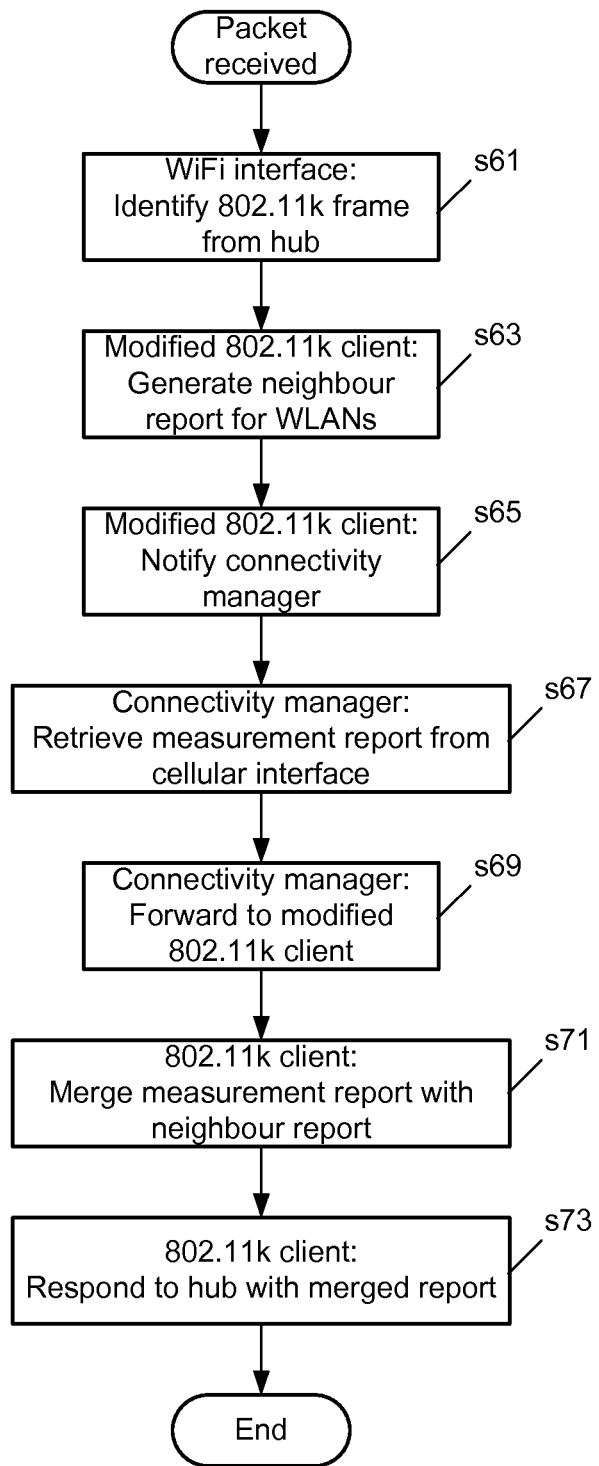
FIG. 7 is a flowchart showing the operation of the U.

FIG. 7 is a flowchart showing the processing of the UE in response to an action frame requesting information about all neighbor cellular and Wi-Fi networks currently visible to the UE 9.

In s61, the WiFi interface 71 identifies the action frame relating to the 802.11k request. If such a frame is received, the modified 802.11k client 75 is notified and in step s63 the neighbor report for surrounding WLANs is generated in a similar manner to the processing in an 802.11k hub.

In order to include information about the cellular networks, in s65 the modified 802.11k client 75 notifies the connectivity manager 67 that a request has been received.

In s67, the connectivity manager 69 communicates with the cellular interface 69 and retrieves the information in the measurement report 73 about any observed cellular networks including Radio Access Technology, frequency band and signal strength observed by the UE. In s69, the connectivity manager 69 forwards the retrieved information to the modified 802.11k client.

In s71, the modified 802.11k client 75 merges the cellular network measurement report 73 information with the generated neighbor report and in s73 responds to the network status information requestor 47 and processing ends.

The processing of the UE provides the hub with alternative network information. This enables the hub to evaluate the relative qualities of the current connection and possible connections via other networks in order to determine whether to allow the UE's request for VoWiFi to be allowed or whether an alternative network would be more suitable for carrying voice services.

Second Embodiment

In the first embodiment, a hub can intercept a request from a UE registering for VoWiFi and determine the quality of the current VoWiFi path between the UE and the ePDG. It also receives information of alternative networks available to the UE. If the quality of the current connection is more suitable for VoWiFi than any alternative network, then the VoWiFi request is forwarded to the ePDG. However, if the quality of the VoWiFi link is lower than an alternative network, then the hub will identify a recommended alternative network and notify the UE. Once notified, the UE is steered to the recommended access network for voice services.

The advantage of the embodiment is that, if needed, the UE is steered to a different access network before control data reaches the external networks. This reduces control information being passed to the ePDG via the external network and the associated resource hit this incurs.

The drawbacks of such a solution is that this functionality requires modifications to every hub to be capable of providing the capability and in use there is more processing load on the hub.

In the second embodiment, a more centralized approach is taken whereby the admission control for a UE to use VoWiFi is carried out by the ePDG of the cellular network.

Figure 8:
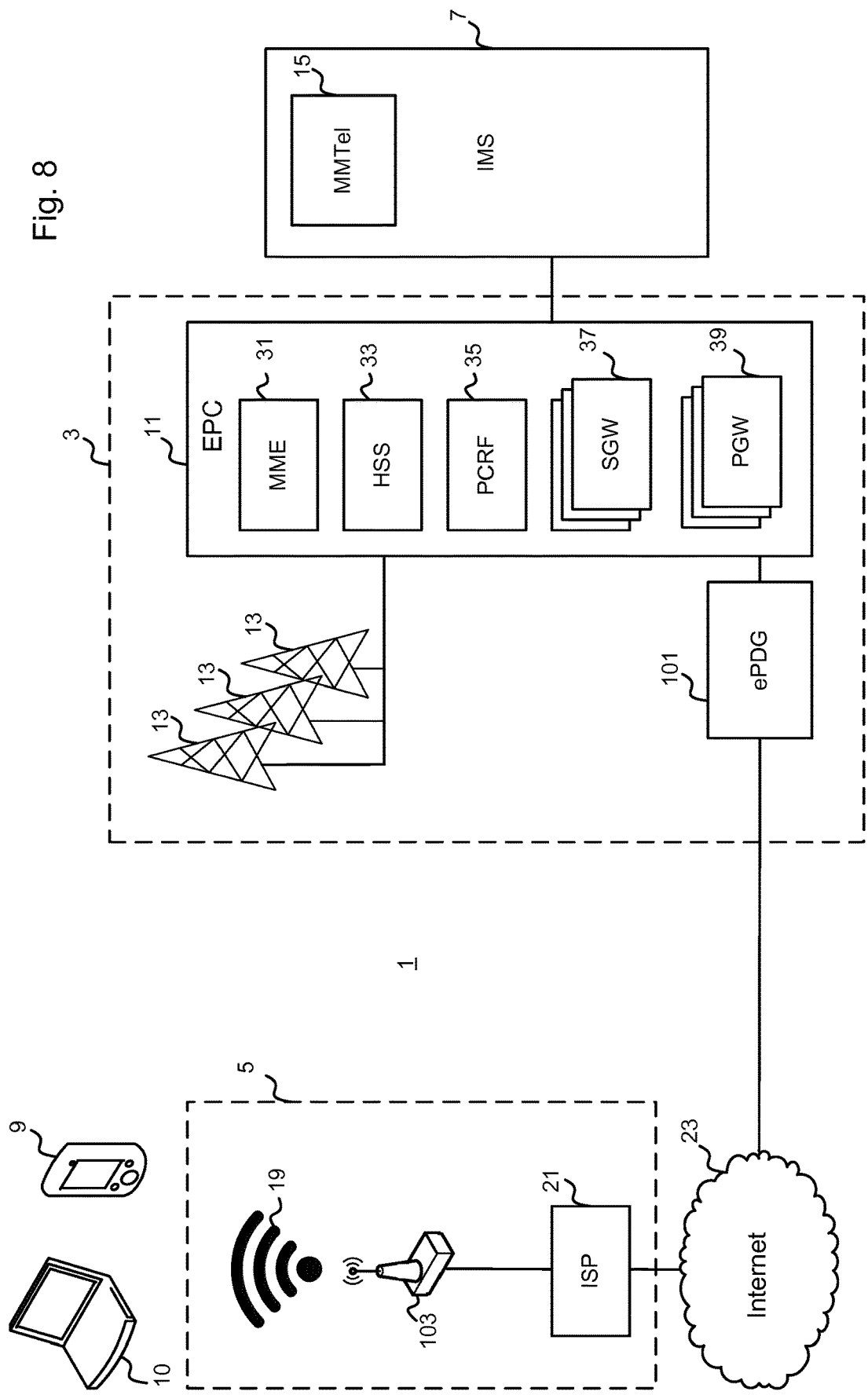
FIG. 8 schematically shows an overview of a telecommunications system according to a second embodiment.

FIG. 8 is an overview of the system according to the second embodiment.

The system shown in FIG. 8 differs from the system of FIG. 1 with the substitution of ePDG 101 and hub 103. Components which have the same functionality as in the first embodiment have the same reference numeral and will not be described again. Since the operation of the hub in the first embodiment was largely transparent to the UE, the UE 9 of the second embodiment is functionally the same.

In the second embodiment, in order to establish a VoWiFi connection via the ePDG 101, the UE 9 will first connect to a WLAN 19 of a hub 103. Once wirelessly connected, the UE will attempt to establish a secure connection using IPSec to the ePDG 101 via the broadband link from the hub 103 to the ISP 21 and Internet 23.

In this embodiment, the hub 103 has less modifications compared with the hub of the first embodiment, the hub 103 does not need to carry out any IP Flow analysis or packet inspection to identify IPSec requests nor perform any measurements of the WLAN and broadband link.

The hub of the second embodiment does however contain the UE information requestor function to communicate with the modified 802.11k function of the UE in order to obtain information about any neighboring WLAN and cellular networks. These are forwarded to the ePDG 101 instead of being processed locally.

The ePDG 101 is the destination end point of the UE's IPSec tunnel request, the ePDG 101 is configured to perform the Admission Control decision by evaluating any received IPSec requests, and determining whether a UE's request for VoWiFi should be allowed or whether an alternative network would be more suitable for voice communication.

Although carried out by the ePDG 101 instead of the hub 103, as in the first embodiment, the quality of the current VoWiFi path is compared with the likely quality of VoLTE or VoWiFi paths available from other network links. The IPSec request is allowed if the quality of the VoWiFi link is deemed to be the same or higher quality than the alternative networks. Conversely, the IPSec request is rejected if the detected alternate networks are deemed to be capable of providing a better voice service.

Furthermore, in this embodiment, the ePDG 101 can also choose to reject a UE request for other reasons not related to link quality, namely a policy to drop a VoWiFi connection request if the UE is connected to a blacklisted hub.

Figure 9:
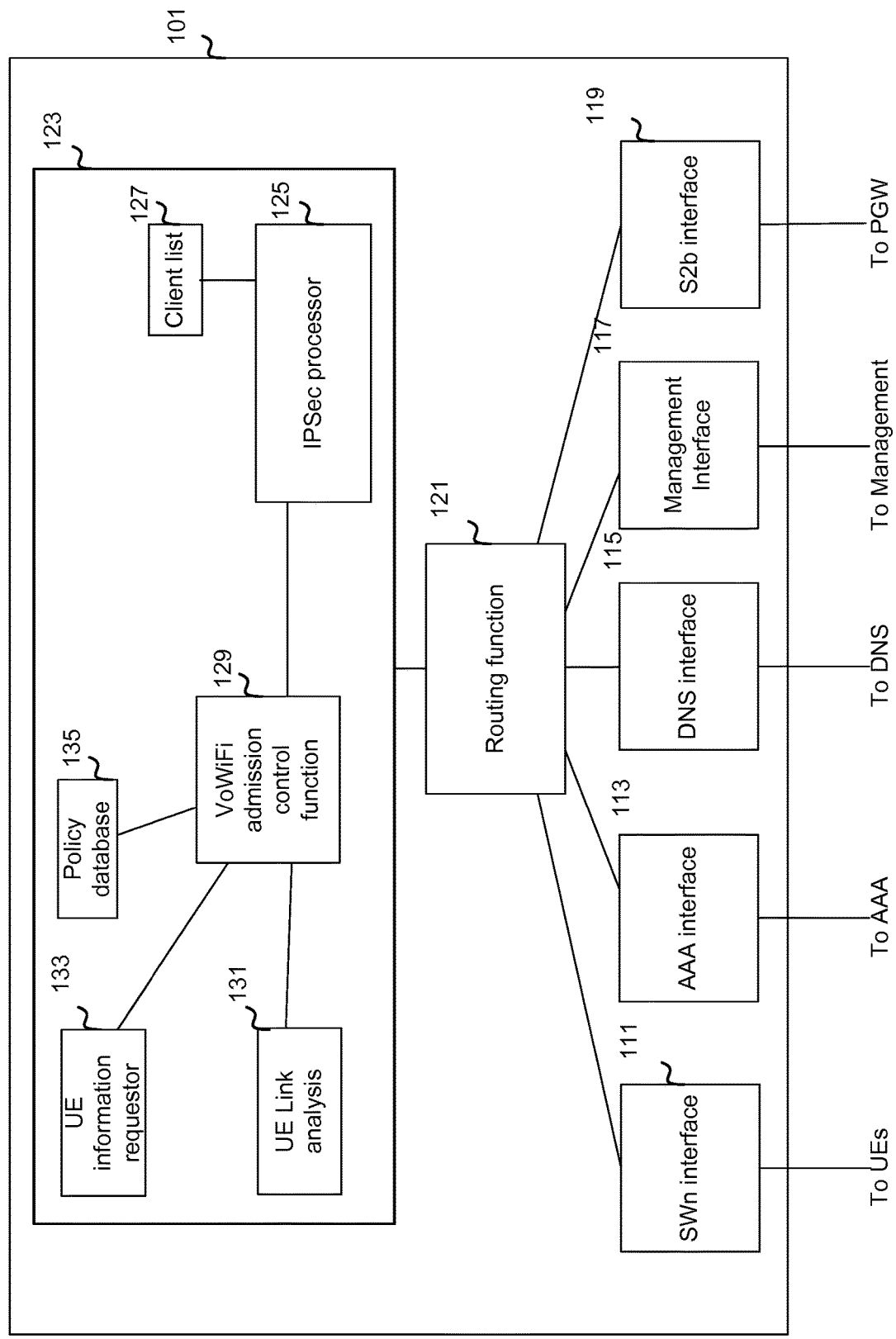
FIG. 9 schematically shows the functional components of an ePDG illustrated in FIG. 8.

FIG. 9 schematically shows the functional components of the ePDG 101 in the second embodiment.

The ePDG contains interfaces to various network components:

The SWm interface 111 connects to UEs via non-trusted non-3GPP networks;

The AAA interface 113 connects to an Authentication, Authorization and Accounting server located in the network core;

The DNS interface 115 connects to a DNS server within the network core;

The Management interface 117 connects to a management device for configuring the operation of the ePDG; and The S2b interface connects to a PGW of the network core.

To route packets between the various interfaces, the ePDG contains a routing function 121 to inspect the packets and forward them to the relevant interfaces for external processing. Where packets are directed to the ePDG itself, for example requests from UEs for establishing IPSec tunnels, the packets are forwarded to a processing function 123.

The processing function 123 has an IPSec processor 125 for analyzing incoming requests from UEs. In accordance with the second embodiment, the IPSec processor 125 is responsible for allocating resources to incoming tunnel requests. The IPSec processor 125 is connected to a client list 127 and a VoWiFi admission control function 129. In combination, these components of the ePDG 101 in accordance with the second embodiment, determine whether a VoWiFi request should be accepted.

The client list 127 contains a list of existing IPSec sessions to UEs that have already established VoWiFi connections. The IPSec processor 125 uses this list to identify new VoWiFi requests from UEs.

The VoWiFi admission control function 129 is connected to a UE link analysis function 131, a UE information requestor 133 and a policy database 135 to determine whether the VoWiFi request should be allowed.

Figure 10:
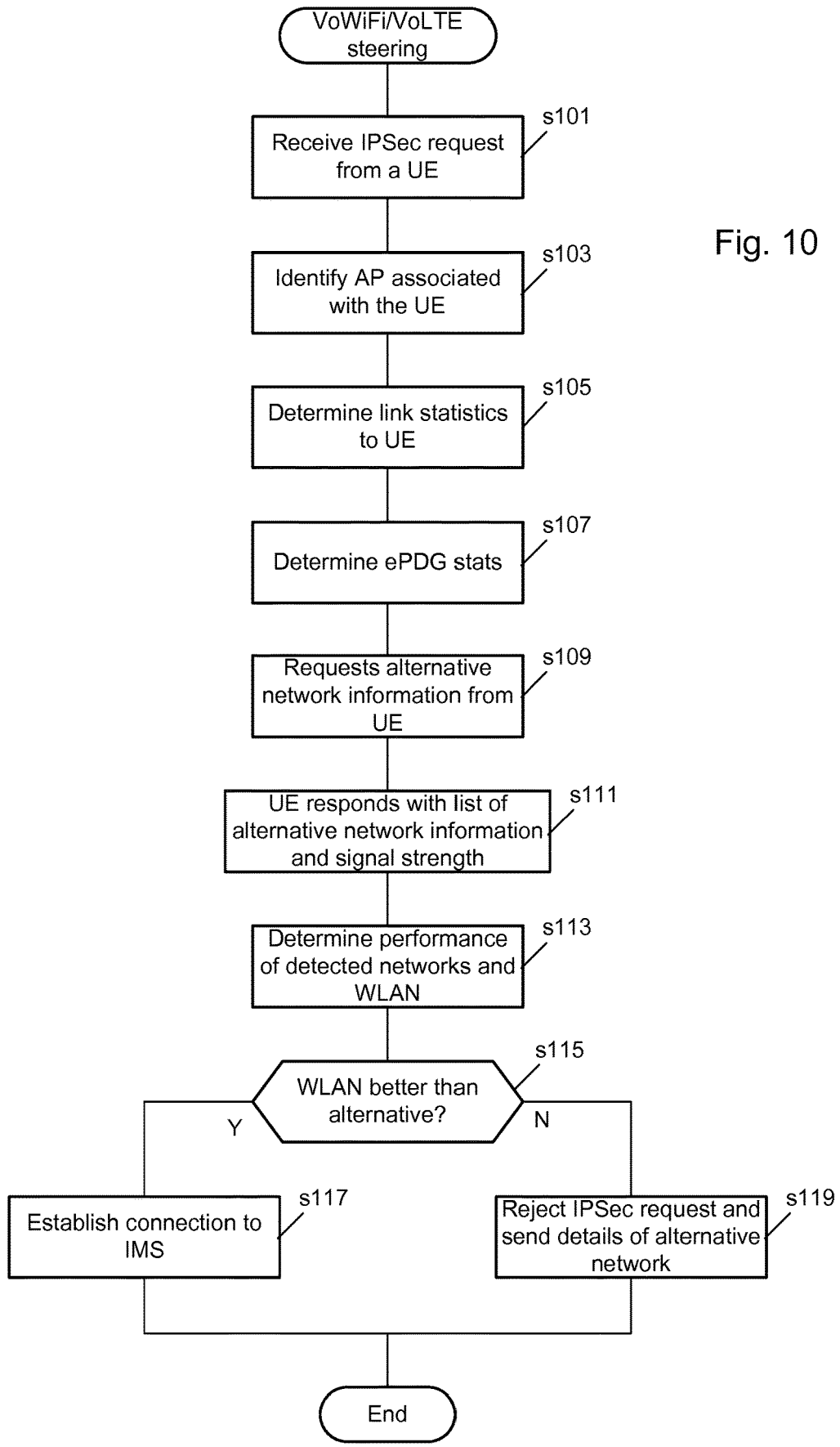
FIG. 10 is a flowchart showing the processing of an ePDG in the second embodiment.

The operation of the processing function 123 in the ePDG 101 will be described with reference to FIG. 10. FIG. 10 is a flowchart showing the operation of the ePDG in the second embodiment.

The operation begins, in s101, with the ePDG receiving an IPSec tunnel establishment request from a UE located on a non-trusted 3GPP network.

In s103, the ePDG processes the source header of the IP data packet to identify the wireless access point router (hub) associated with the requesting UE. Since the IPSec request is encapsulated in an IP packet, the hub will have replaced the UE's WLAN address with its public IP address before routing the packet to the ePDG.

To determine whether the request for VoWiFi should be allowed for the UE, in s105, the ePDG determines statistics for the data link to the UE. The requested information includes load, the number of current Wi-Fi endpoints, throughput and also statistics for the link to the AP. In this embodiment, the UE link analysis function pings the UE to determine latency, jitter and packet loss data for the data path link.

In s107, the ePDG then monitors its own load information to determine whether it can support a VoWiFi request. This includes the number of currently active IPSec tunnel connections.

In s109, the ePDG requests information relating to any alternative networks within range of the UE and in s111 the list of available networks is received from the UE. In these two steps, the ePDG actually sends control data requests to the hub 103 and the UE information requestor of the hub 103 interacts with the 802.11k client of the UE as described in the first embodiment. The returned data about available networks is then sent to the ePDG 101.

In s113, the ePDG 101 uses the collected information to determine quality scores for the VoWiFi and alternative network links in a similar manner to the equivalent VoWiFi admission control function of the hub in the first embodiment. Furthermore the calculated quality scores can be modified/normalized based on other information available to the ePDG. For example, if the UE 9 is within range of an eNodeB of the cellular network, the ePDG 101 will modify any calculated quality score based on a real-time view of the load conditions the observed eNodeB since the ePDG is part of the same cellular network. Furthermore, if the other WLANs are available to the UE, the calculated quality score for those alternative WLANs are lowered if the ePDG is overloaded, since its ability to service VoWiFi sessions would be reduced regardless of the WLAN used by the UE.

In s115, a comparison of the quality of the VoWiFi connection and the highest performing alternative network connection (after normalization/adjustment) is carried out and if it is determined that the current WLAN path has the highest quality, a VoWiFi connection is possible, and therefore the IPSec request is allowed and the VoWiFi connection can be established with the IMS.

Alternatively, if the quality of the cellular network/alternative network connection is higher, then in step s119, the ePDG will reject the IPSec request and include an identity of the alternative network so that the UE will not be able to connect and therefore it will revert to the alternative network.

The second embodiment uses an ePDG which can determine both VoWiFi path and VoLTE path quality and can make decisions about how to steer devices requesting VoWiFi following the standard UE behavior.

Alternatives and Modifications

In the first embodiment, the admission control function determines the status of the WLAN and broadband local links and also the alternative networks detected by the UE. Other network information can be used, in an alternative, the access point accesses information relating to the presence of adjacent networks. This information may be either pre-configured or dynamically updated on the Wi-Fi Access Point. This information allows the ISP to statically or dynamically configure the Wi-Fi Access Point to inform it that an alternative Wi-Fi network available in the area that is more suitable for Wi-Fi Calling.

In the above embodiments, quality scores are calculated for each of the available alternative networks and then only the network having the highest quality score is used in the comparison against the WLAN conditions. This reduces the processing time since only one comparison needs to be performed. In an alternative, every available network is compared and details of each available network which can provide better voice service than the WLAN are sent to the user.

In the embodiments, IPFlow packet inspection of the packet headers is used to detect possible IPSec requests between a UE connected to the hub WLAN and an ePDG. There are different ways of determining whether an IPSec session has been requested. In an alternative, a Deep Packet Inspection (DPI) function in the hub may identify IPSec establishment requests that can be associated with a VoWiFi service (e.g. sent to a pre-configured domain name or with a VoWiFi indicator embedded in the request).

In the embodiments, a client loaded into the UE is configured to communicate with the hub to process requests to locate other radio access networks and respond to the requests from the hub. In other cases, the functionality is built into the operating system or any other processor (e.g. modem chipset) of the UE.

In the embodiments, the UE merges WiFi neighbor information with cellular network measurement reports and forwards the combined data set to the hub. Once received, the VoWiFi admission control function will calculate quality scores for the various networks.

In an alternative, the modified 802.11k client or a sub-function of the UE can also calculate quality scores of the observed networks which are included in the returned information sent to the hub. In a further alternative, the modified 802.11k client only sends quality scores in place of the measurement reports.

In the second embodiment, the ePDG determines the performance of the potential VoWiFi link by analyzing the performance statistics of packets sent and received from the UE to reduce the number of modifications required to the hub. In an alternative, the ePDG is linked to the hub of the first embodiment and requests WLAN statistics from the hub in a similar manner to the first embodiment.

In the first embodiment, a system is described in which the hubs are responsible for controlling access to the VoWiFi service by UEs while in the second embodiment the ePDG is the only controller for VoWiFi access. In an alternative, the ePDG of the second embodiment and hubs from the first embodiment are combined so that the system contains a mix of entities for controlling access.

Insofar as embodiments of the disclosure described are implementable, at least in part, using a software-controlled programmable processing device, such as a microprocessor, digital signal processor or other processing device, data processing apparatus or system, it will be appreciated that a computer program for configuring a programmable device, apparatus or system to implement the foregoing described methods is envisaged as an aspect of the present disclosure. The computer program may be embodied as source code or undergo compilation for implementation on a processing device, apparatus or system or may be embodied as object code, for example.

Suitably, the computer program is stored on a carrier medium in machine or device readable form, for example in solid-state memory, magnetic memory such as disk or tape, optically or magneto-optically readable memory such as compact disk or digital versatile disk etc., and the processing device utilizes the program or a part thereof to configure it for operation. The computer program may be supplied from a remote source embodied in a communications medium such as an electronic signal, radio frequency carrier wave or optical carrier wave. Such carrier media are also envisaged as aspects of the present disclosure.

It will be understood by those skilled in the art that, although the present disclosure has been described in relation to the above described example embodiments, the disclosure is not limited thereto and that there are many possible variations and modifications which fall within the scope of the invention.

The scope of the present disclosure includes any novel features or combination of features disclosed herein. The applicant hereby gives notice that new claims may be formulated to such features or combination of features during prosecution of this application or of any such further applications derived therefrom. In particular, with reference to the appended claims, features from dependent claims may be combined with those of the independent claims and features from respective independent claims may be combined in any appropriate manner and not merely in the specific combinations enumerated in the claims.

The invention claimed is:

1. A method of operating a network gateway in a cellular network to control access of at least one mobile device to a voice service accessible via the cellular network, the at least one mobile device being connected to the network gateway via a wireless access router and wide area network (WAN), the method comprising:
    by the network gateway:
        receiving a request from the at least one mobile device to access the voice service;
        measuring performance metrics for a non-cellular wireless network link to the at least one mobile device;
        requesting observed network information from the at least one mobile device; and
        comparing a quality of the non-cellular wireless network link to the at least one mobile device against a respective quality of at least one observed network;
        if the quality of the non-cellular wireless network link is greater than the quality of an available observed network, allowing the request to proceed to the cellular network; and
        if the quality of at least one of the observed networks is higher than the current non-cellular wireless network link, rejecting the voice service request of the at least one mobile device.

2. The method according to claim 1, further comprising: receiving observed network identifiers and signal strength measurements from the at least one mobile device; and calculating a quality score for each observed network identifier from respective signal strength measurements relating to the observed network.

3. The method according to claim 1, further comprising receiving observed network identifiers and quality scores calculated by the at least one mobile device.

4. The method according to claim 1, further comprising sending the identity of at least one of the observed networks having a higher quality score than the non-cellular wireless network link as an alternative network for accessing the voice service.

5. The method according to claim 1, further comprising:
    monitoring for load conditions on the network gateway; and
    modifying the received quality scores of the observed networks.

6. The method according to claim 1, wherein a Voice over WiFi data path is established between the at least one mobile device and the voice service via the wireless access router and the network gateway.

7. A non-transitory computer-readable storage medium storing a computer program comprising instructions which, when the computer program is executed by a computer, cause the computer to carry out the method of claim 1.

8. A network gateway for controlling access of at least one mobile device to a voice service accessible via a cellular network, the at least one mobile device being connected to the network gateway via a wireless access router and wide area network (WAN), comprising:
    a wide area network interface;
    a secure data tunnel controller for receiving a request from the at least one mobile device to access the voice service via the wide area network interface;
    means for measuring performance metrics for a non-cellular wireless network link to the at least one mobile device;
    means for requesting observed network information from the at least one mobile device; and
    means comparing a quality of the non-cellular wireless network link to the at least one mobile device against a respective quality of at least one observed network; and
    an access controller configured to:
        allow the request to proceed to the cellular network, if the quality of the non-cellular wireless network link is greater than the quality of an available observed network; and
        reject the voice service request of the mobile device, if the quality of at least one of the observed networks is higher than the non-cellular wireless network link.

9. The network gateway according to claim 8, further comprising:
    means for receiving observed network identifiers and signal strength measurements from the at least one mobile device; and
    means for calculating a quality score for each observed network identifier from respective signal strength measurements relating to the observed network.

10. The network gateway according to claim 8, further comprising means for receiving observed network identifiers and quality scores calculated by the at least one mobile device.

11. The network gateway according to claim 8, wherein the access controller is operable to send an identity of at least one of the observed networks having a higher quality score than the non-cellular wireless network link as an alternative for accessing the voice service.

12. The network gateway according to claim 8, further comprising:
   means for monitoring load conditions on the network gateway; and
   means for modifying the received quality scores of the observed networks in dependence upon the load conditions.

13. The network gateway according to claim 8, wherein a Voice over WiFi data path is established between the mobile device and the voice communication service via the wireless access router and the network gateway.

14. A system comprising:
   at least one processor and memory for operating a network gateway in a cellular network to control access of at least one mobile device to a voice service accessible via the cellular network, the at least one mobile device being connected to the network gateway via a wireless access router and wide area network (WAN), so as to cause the network gateway to:
   receive a request from the at least one mobile device to access the voice service;
   measure performance metrics for a non-cellular wireless network link to the at least one mobile device;
   request observed network information from the at least one mobile device; and
   compare a quality of the non-cellular wireless network link to the at least one mobile device against a respective quality of at least one observed network;
   if the quality of the non-cellular wireless network link is greater than the quality of an available observed network, allow the request to proceed to the cellular network; and
   if the quality of at least one of the observed networks is higher than the current non-cellular wireless network link, reject the voice service request of the at least one mobile device.

\* \* \* \* \*